US012621754B2

(12) United States Patent
Lu et al.

(10) Patent No.: US 12,621,754 B2
(45) Date of Patent: May 5, 2026

(54) INTER-RADIO ACCESS TECHNOLOGY (RAT)

(71) Applicant: ZTE Corporation, Shenzhen (CN)

(72) Inventors: Ting Lu, Shenzhen (CN); Bo Dai, Shenzhen (CN); Xiubin Sha, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/151,329

(22) Filed: Jan. 6, 2023

(65) Prior Publication Data

US 2023/0156573 A1 May 18, 2023

Related U.S. Application Data

(63) Continuation of application No. 17/268,384, filed on Feb. 12, 2021, now Pat. No. 11,595,881.

(51) Int. Cl.
| | |
|---|---|
| *H04W 48/18* | (2009.01) |
| *H04W 48/12* | (2009.01) |
| *H04W 72/542* | (2023.01) |
| *H04W 72/56* | (2023.01) |
| *H04W 88/06* | (2009.01) |

(52) U.S. Cl.
CPC ........... *H04W 48/12* (2013.01); *H04W 48/18* (2013.01); *H04W 72/542* (2023.01); *H04W 72/56* (2023.01); *H04W 88/06* (2013.01)

(58) Field of Classification Search
CPC ... H04W 48/12; H04W 48/18; H04W 72/542; H04W 72/56; H04W 88/06
See application file for complete search history.

(56) References Cited

U.S. PATENT DOCUMENTS

| | | | | |
|---|---|---|---|---|
| 9,258,769 B2 * | 2/2016 | Ore | ...................... | H04W 48/20 |
| 9,717,024 B2 * | 7/2017 | Shirota | ............... | H04W 84/042 |

(Continued)

FOREIGN PATENT DOCUMENTS

| | | |
|---|---|---|
| CN | 102104854 | 6/2011 |
| CN | 103238348 | 8/2013 |

(Continued)

OTHER PUBLICATIONS

Chinese Office Action for Application No. 201880098206.9, dated Nov. 2, 2021, 18 pages with unofficial translation.

(Continued)

*Primary Examiner* — Julio R Perez
(74) *Attorney, Agent, or Firm* — Perkins Coie LLP

(57) ABSTRACT

Techniques are described for facilitating an inter-Radio Access Technology (RAT) selection or measurement process for a dual-mode or a multi-mode device. For example, a wireless communication method includes a network node transmitting to a communication node a system information block (SIB) that includes information about Radio Access Technologies (RATs). The information includes any one or more of a first carrier priority value and a first threshold value of a serving frequency associated with a RAT, a second carrier priority value and a second threshold value of a serving cell associated with the RAT, an indicator to indicate existence of one or more additional RATs, carrier information for the one or more additional RATs, and access information to access the one or more additional RATs.

8 Claims, 9 Drawing Sheets

(56) References Cited

U.S. PATENT DOCUMENTS

| | | | | |
|---|---|---|---|---|
| 2012/0082051 | A1 | 4/2012 | Kim et al. | |
| 2012/0322447 | A1* | 12/2012 | Ramachandran | H04W 48/18 |
| | | | | 455/436 |
| 2014/0233452 | A1 | 8/2014 | Kim et al. | |
| 2014/0287694 | A1 | 9/2014 | Kim et al. | |
| 2014/0335867 | A1 | 11/2014 | Hsu et al. | |
| 2015/0208414 | A1* | 7/2015 | Ji | H04W 48/20 |
| | | | | 455/454 |
| 2016/0050599 | A1* | 2/2016 | Yang | H04W 36/0005 |
| | | | | 455/436 |
| 2016/0219501 | A1* | 7/2016 | Chang | H04W 88/06 |
| 2017/0353915 | A1* | 12/2017 | da Silva | H04W 48/18 |
| 2018/0146410 | A1* | 5/2018 | Cho | H04W 72/23 |
| 2023/0156573 | A1* | 5/2023 | Lu | H04W 72/56 |
| | | | | 370/338 |
| 2024/0089818 | A1* | 3/2024 | Abotabl | H04W 36/00837 |
| 2024/0314173 | A1* | 9/2024 | Nair | H04L 63/20 |
| 2024/0314568 | A1* | 9/2024 | Vemuri | G06F 3/04817 |
| 2024/0314622 | A1* | 9/2024 | Malkin | H04W 28/0247 |
| 2024/0314838 | A1* | 9/2024 | Onoda | H04W 74/0808 |

FOREIGN PATENT DOCUMENTS

| | | | | | |
|---|---|---|---|---|---|
| CN | 103703839 | | 4/2014 | | |
| CN | 103975543 | | 8/2014 | | |
| CN | 103988540 | | 8/2014 | | |
| CN | 107949009 | | 4/2018 | | |
| EP | 2721876 | | 10/2015 | | |
| EP | 2721876 | B1 * | 10/2015 | | H04W 48/18 |
| EP | 3136782 | | 1/2017 | | |
| EP | 3136782 | A1 * | 3/2017 | | H04W 48/18 |
| EP | 3025550 | B1 * | 1/2020 | | H04W 48/18 |
| EP | 3780889 | A1 * | 2/2021 | | H04W 76/27 |
| JP | 2024535854 | A * | 10/2024 | | H04W 36/0061 |
| RU | 2015140827 | A * | 12/2018 | | G01S 5/019 |
| WO | 2016/107887 | | 7/2016 | | |
| WO | 2018144523 | | 8/2018 | | |
| WO | WO-2020076145 | A1 * | 4/2020 | | H04W 88/06 |

OTHER PUBLICATIONS

Notification to Complete Formalities of Registration for Chinese Patent Application No. 201880098206.9, mail date: Sep. 27, 2022, 6 pages with unofficial translation.

International Search Report and Written Opinion in International Application No. PCT/CN2018/108137, mailed May 29, 2019, 9 pages.

Partial Search Report for EP 18929927.4, dated Oct. 14, 2021, 17 pages.

European Search Report for European Patent Application No. EP 18929927.4, dated Jan. 10, 2022, 15 pages.

ZTE, "Consideration on inter-RAT cell selection/reselection in NB-IoT," 3GPP TSG-RAN2 meeting #103bis, Chengdu, China, Oct. 8-12, 2018, R2-1814313, 8 pages.

Ericsson, et al. "CSG ID coding," 3GPP TSG RAN WG2 Meeting #64 Prague, Czech Republic, Nov. 10-15, 2008, R2-087265, ex-R2-087007, 6 pages.

Starpoint, et al. "Intra-frequency cell reselection under normal coverage for NB-IOT," 3GPP TSG-RAN WGS Meeting #3-IoT Adhoc Kochi, India, Jan. 10, 2017-Jan. 13, 2017, 7 pages.

Intention to Grant Rule 71(3) Communication for European Patent Application No. EP 18929927.4, dated Sep. 18, 2023, 8 pages.

Extended European Search Report for European Patent Application No. EP 24150525.4 dated Apr. 25, 2024, 11 pages.

Ericsson "Introduction of low complexity UE and enhanced coverage features" 3GPP TSG-RAN WG2 Meeting #92 Anaheim, CA, USA, Nov. 16-20, 2015, R2-156777, 3 pages.

Ericsson "Update Inter-RAT cell reselection chapter 6.2.3 for Band > 64" 3GPP TSG-RAN WGS Meeting #75 Hangzhou, China, May 15-19, 2017, R5-172287, 54 pages.

3rd Generation Partnership Project; "Technical Specification Group Radio Access Network; Evolved Universal Terrestrial Radio Access (E-UTRA); User Equipment (UE) procedures in idle mode (Release 15)" 3GPP TS 36.304 V15.0.0 (Jun. 2018) 52 pages.

* cited by examiner

100

Network Node 1
(102a)

UE (104)

Network Node 2
(102b)

Transmitting a system information block (SIB) that includes information about a plurality of Radio Access Technologies (RATs) — 202

Receiving a system information block (SIB) that includes information about a plurality of Radio Access Technologies (RATs) — 302

Triggering an inter-Radio Access Technology (RAT) cell selection or reselection process based on an event

452

Transmitting a first set of parameters for a first type of communication nodes or a second set of parameters for a second type of communication nodes

502

Figure 6:
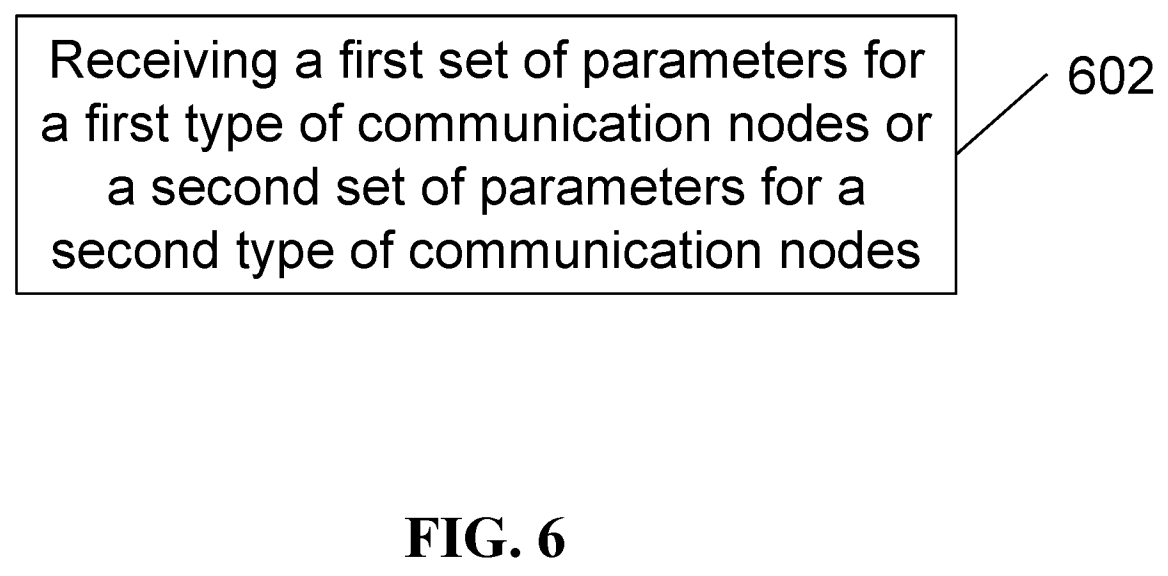

Receiving a first set of parameters for a first type of communication nodes or a second set of parameters for a second type of communication nodes

Receiving a plurality of sets of parameters for inter-Radio Access Technology (RAT) cell selection or reselection

704

Selecting one set of parameters according to a coverage condition of the communication node and/or a bandwidth condition of the communication node

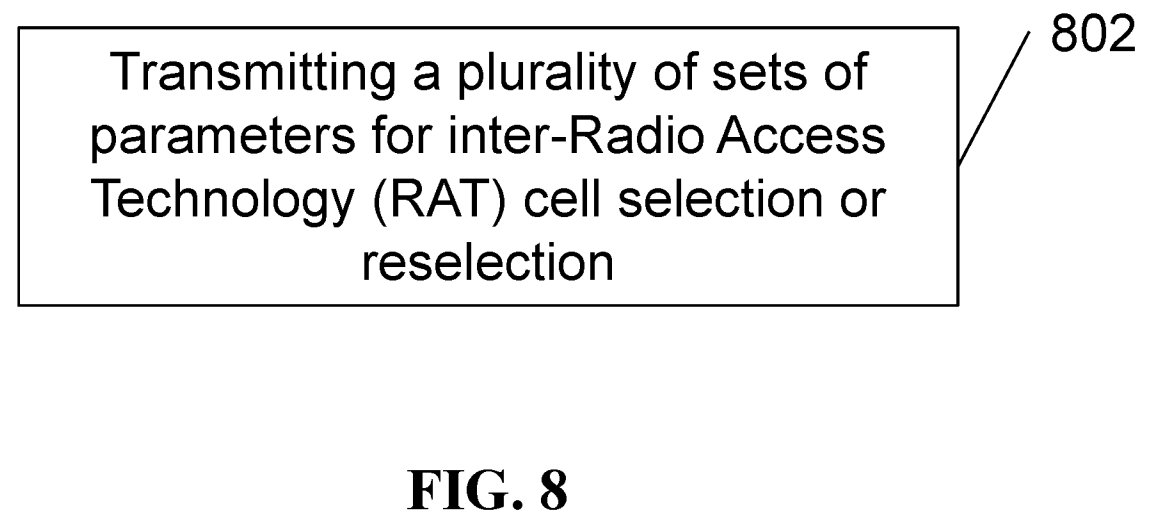

802

Transmitting a plurality of sets of parameters for inter-Radio Access Technology (RAT) cell selection or reselection

FIG. 8

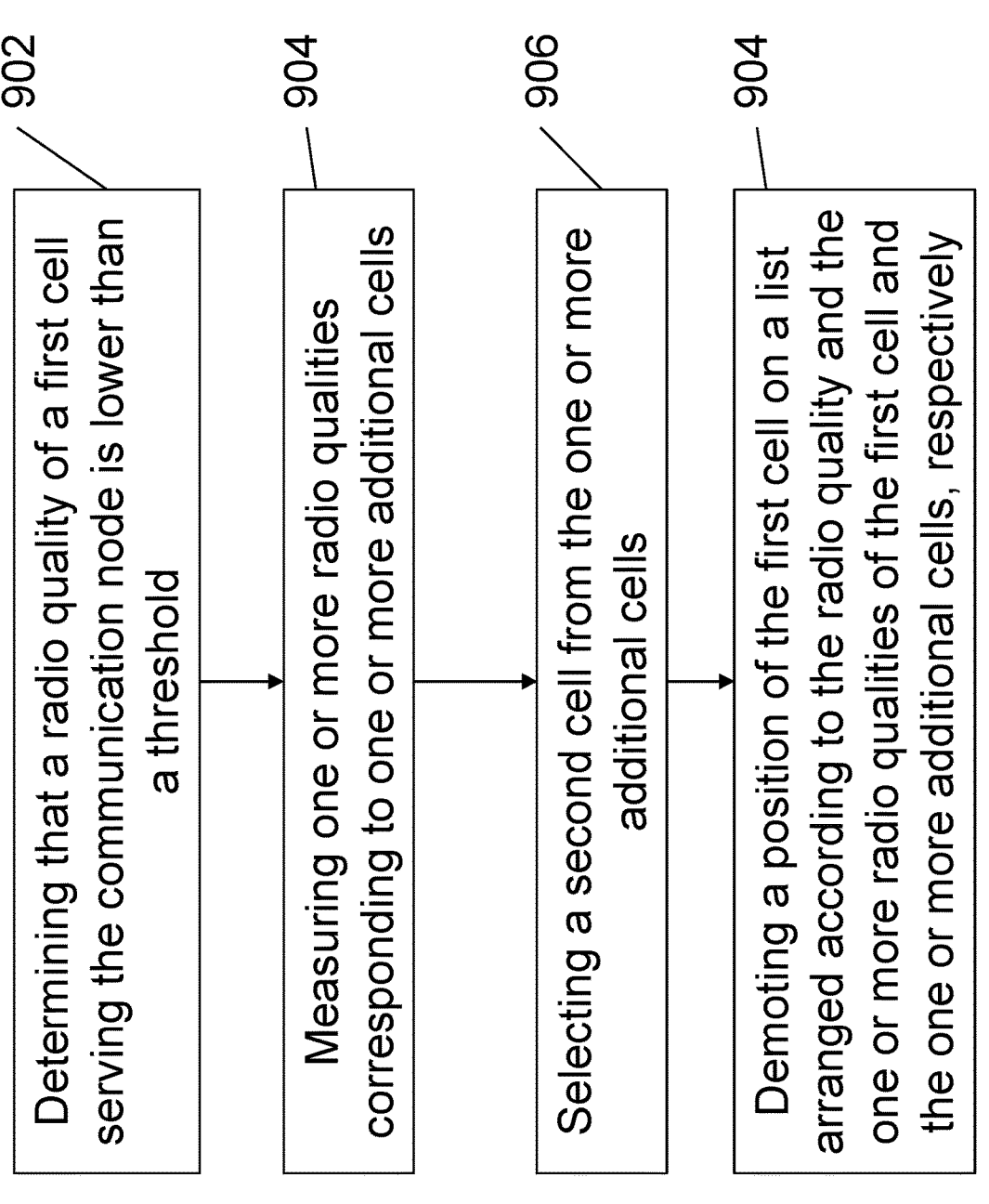

902

Determining that a radio quality of a first cell serving the communication node is lower than a threshold

904

Measuring one or more radio qualities corresponding to one or more additional cells

906

Selecting a second cell from the one or more additional cells

904

Demoting a position of the first cell on a list arranged according to the radio quality and the one or more radio qualities of the first cell and the one or more additional cells, respectively

| Memory 1005 | Processor(s) 1010 |
| Transmitter 1015 | Receiver 1020 |

INTER-RADIO ACCESS TECHNOLOGY (RAT)

CROSS-REFERENCE TO RELATED APPLICATIONS

This application is a continuation of U.S. application Ser. No. 17/268,384, filed Feb. 12, 2021, which is a U.S. national stage application of International Patent Application No. PCT/CN2018/108137, filed on Sep. 27, 2018, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for inter-Radio Access Technology (RAT) measurement, cell selection, or cell re-selection.

A first exemplary embodiment discloses a wireless communication method, comprising transmitting, by a network node, a system information block (SIB) that includes information about a plurality of Radio Access Technologies (RATs). The information includes any one or more of: a first carrier priority value and a first threshold value of a serving frequency associated with a RAT, a second carrier priority value and a second threshold value of a serving cell associated with the RAT, an indicator to indicate existence of one or more additional RATs, carrier information for the one or more additional RATs, and access information to access the one or more additional RATs.

A second exemplary embodiment discloses a wireless communication method, comprising receiving, by a communication node, a system information block (SIB) that includes information about a plurality of Radio Access Technologies (RATs). The information includes any one or more of: a first carrier priority value and a first threshold value of a serving frequency associated with a RAT, a second carrier priority value and a second threshold value of a serving cell associated with the RAT, an indicator to indicate existence of one or more additional RATs, carrier information for the one or more additional RATs, and access information to access the one or more additional RATs.

In some implementations of the first and second exemplary embodiments, the indicator includes a simple indicator, a bitmap-type indicator, or a list of one or more indicators. In some implementations of the first and second exemplary embodiments, the carrier information is included in a carrier list that includes one or more frequencies, one or more priority values associated with the one or more frequencies or the one or more additional RATs, one or more carrier frequency or cell radio quality thresholds, or one or more timers.

In some implementations of the first and second exemplary embodiments, the carrier list is included in a container list, where each item in the container list relates to one RAT. In some implementations of the first and second exemplary embodiments, the access information includes a system information message for at least one RAT. In some implementations of the first and second exemplary embodiments, the RAT and the one or more additional RATs includes Narrowband Internet-of-Things (NB-IoT) technology, Global System for Mobile communications (GSM) Enhanced data rates for GSM evolution Radio Access Network (GERAN) technology, enhanced Machine-Type Communication (eMTC) technology, Long Term Evolution (LTE) technology, or Fifth Generation New Radio (5G NR) technology.

A third exemplary embodiment discloses a wireless communication method, comprising: triggering, by a communication node, an inter-Radio Access Technology (RAT) cell selection or reselection process, and selecting, after the triggering, a frequency or a RAT to communicate with a second cell. The frequency is selected from one or more frequencies previously accessed by the communication node or wherein the RAT is selected from one or more RATs previously accessed by the communication node. In some implementations of the third exemplary embodiment, the one or more frequencies are associated with one or more priority values determined based on an evaluation of service of one or more cells. In some implementations of the third exemplary embodiment, the frequency has a highest priority among the one or more priority values associated with the one or more frequencies. In some implementations of the third exemplary embodiment, the communication node performs the selecting without performing any measurements on one or more additional cells, including the second cell. In some implementations of the third exemplary embodiments, the triggering and/or the selecting are performed while a timer is running In some implementations of the third exemplary embodiment, the service of the one or more cells is evaluated based on any one of: radio quality, access success rate, paging success rate, and service performance.

A fourth exemplary embodiment discloses a wireless communication method, comprising transmitting, by a network node, a first set of parameters for a first type of communication nodes or a second set of parameters for a second type of communication nodes. A first sensitivity to power consumption of the first type of communication nodes is lower than a second sensitivity to power consumption of the second type of communication nodes, and the first set of parameters or the second set of parameters include any one or more of: a list of frequencies, priority values associated with the frequencies, and a threshold value indicative of a quality of transmission that triggers a measurement.

A fifth exemplary embodiment discloses a wireless communication method, comprising receiving, by a communication node, a first set of parameters for a first type of communication nodes or a second set of parameters for a second type of communication nodes. A first sensitivity to power consumption of the first type of communication nodes is lower than a second sensitivity to power consumption of the second type of communication nodes, and the first set of parameters or the second set of parameters include any one or more of: a list of frequencies, priority values associated with the frequencies, and a threshold value indicative of a quality of transmission that triggers a measurement.

A sixth exemplary embodiment discloses a wireless communication method, comprising receiving, by a communication node, a plurality of sets of parameters for inter-Radio Access Technology (RAT) cell selection or reselection, and selecting one set of parameters according to a coverage condition of the communication node and/or a bandwidth condition of the communication node. Each set of parameters includes any one or more of: priority values associated with frequencies, a first threshold to select a first frequency having a higher priority than a priority of a serving frequency used by the communication, a second threshold to select a second frequency having a lower priority than the priority of the serving frequency used by the communication, a timer to evaluate one or more of the plurality of frequencies for a reselection process, and a third threshold to select a cell having a lower priority than a priority of a currently serving cell.

In some implementations of the sixth exemplary embodiment, each set of parameters further includes any one or more of: a list of the frequencies, and a threshold value indicative of a quality of transmission that triggers a measurement. In some implementations of the sixth exemplary embodiment, the communication node selects one set of parameters according to the coverage condition determined based on radio quality of the currently serving cell. In some implementations of the sixth exemplary embodiment, the communication node selects one set of parameters according to the bandwidth condition by determining that the communication node is a Bandwidth reduced Low complexity (BL) communication node or a non-BL communication node.

A seventh exemplary embodiment discloses a wireless communication method, comprising transmitting, by a network node, a plurality of sets of parameters for inter-Radio Access Technology (RAT) cell selection or reselection, where each set of parameters includes any one or more of: priority values associated with frequencies, a first threshold to select a first frequency having a higher priority than a priority of a serving frequency used by the communication, a second threshold to select a second frequency having a lower priority than the priority of the serving frequency used by the communication, a timer to evaluate one or more of the plurality of frequencies for a reselection process, and a third threshold to select a cell having a lower priority than a priority of a currently serving cell.

In some implementations of the seventh exemplary embodiment, each set of parameters further includes any one or more of: a list of the frequencies, and a threshold value indicative of a quality of transmission that triggers a measurement.

An eighth exemplary embodiment discloses a wireless communication method, comprising determining, by a communication node, that a radio quality of a first cell serving the communication node is lower than a threshold, measuring, after the determining, one or more radio qualities corresponding to one or more additional cells, selecting a second cell from the one or more additional cells, and demoting a position of the first cell on a list arranged according to the radio quality and the one or more radio qualities of the first cell and the one or more additional cells, respectively.

In some implementations of the eighth exemplary embodiment, the position of the first cell is demoted by sorting in the list the first cell and the one or more additional cells based on the radio quality and the one or more radio qualities, and moving the first cell from a first location on the list to a second location on the list, where the second location indicates that the first cell has a lower radio quality than the first location. In some implementations of the eighth exemplary embodiment, the first cell is moved from the first location to the second location by applying an offset value to the radio quality of the first cell.

A ninth exemplary embodiment discloses a wireless communication method, comprising triggering, by a communication node, an inter-Radio Access Technology (RAT) cell selection or reselection process based on an event. In some implementations of the ninth exemplary embodiment, the event may include: the communication node determining that a quality of a first cell in communication with the communication node is lower than a threshold, or the communication node receiving a first indication that a voice service is required, or the communication node receiving a second indication that a service with high data rate is required, or the communication node receiving a third indication that the communication node is out of service in the first cell. In some implementations of the ninth exemplary embodiments, the triggering and/or the selecting are performed while a timer is running.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 6 describes an exemplary flowchart for a communication node to receive a first or a second set of parameters to a first type of communication nodes or a second type of communication nodes.

FIG. 8 describes an exemplary flowchart for a network node to transmit sets of parameters to one or more communication nodes.

FIG. 9 describes an exemplary flowchart for a communication node performing an cell selection or re-selection offset process.

DETAILED DESCRIPTION

This patent document describes techniques that can be used by embodiments to improve inter-Radio Access Technology (RAT) cell selection or reselection. Sections I and II of this document will briefly describe some technical features and issues associated with current Internet-of-Things (IoT) technology, followed by Sections III to VIII where several features and embodiments related to IoT cell selection or reselection are described. The example headings for the various sections below are used to facilitate the understanding of the disclosed subject matter and do not limit the scope of the claimed subject matter in any way. Accordingly, one or more features of one example section can be combined with one or more features of another example section. Furthermore, while 5G terminology is used for the sake of illustration, the described techniques are applicable to other wireless protocols as well.

I. Current IoT Technology

A Narrow Band IoT (NB-IoT) device can provide diverse IoT applications at least due the low-power consumption and cost-effectiveness of NB-IoT device. But the current deployment is dominated by single-mode NB-IoT chipsets which are mainly used by the devices with stationary or very low mobility characteristic, e.g., utility metering.

With the development of the IoT market and industry ecosystem, some multi-mode chipsets can communicate using multiple radio access technologies (e.g. NB-IoT or Global System for Mobile communications (GSM); NB-IoT or enhanced Machine-Type Communication (eMTC); NB-IoT or GSM or eMTC) and are designed for more wide-range IoT devices and IoT applications. The dual-mode or even multi-mode chipset may offer a single platform design that is capable of connecting to both NB-IoT and GSM or General Packet Radio Service (GPRS) networks simultaneously, or is capable of connecting to both eMTC or Long Term Evolution (LTE) networks simultaneously. This enables extended coverage, cross-market application with network transition function and even phone call capability.

Figure 1:
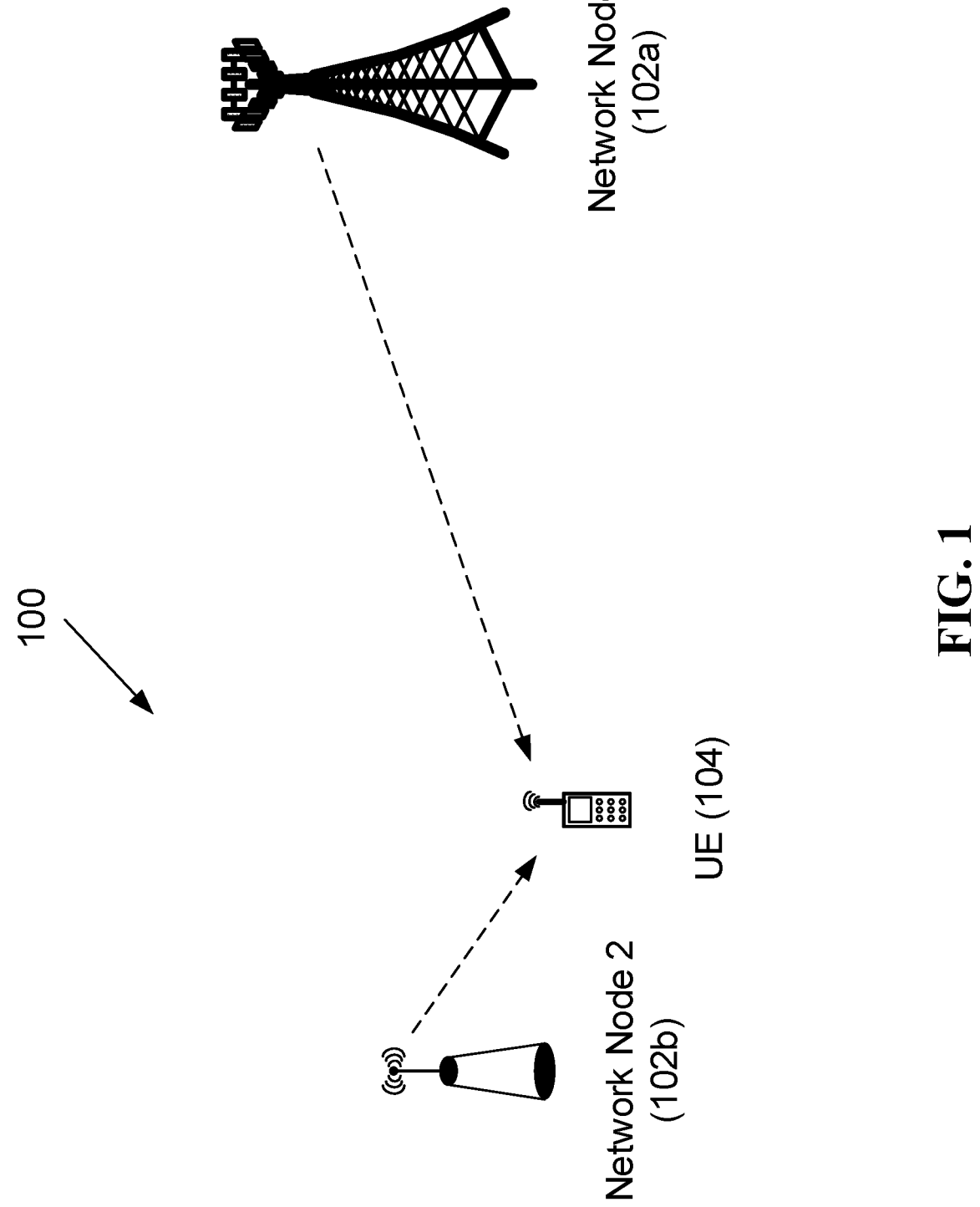
FIG. 1 shows an example of a dual-mode or a multi-mode NB-IoT device communicating with two networks.

FIG. 1 shows an example of dual-mode or a multi-mode NB-IoT device communicating with two networks. The IoT system 100 includes a Network Node 1 (102a) and a Network Node 2 (102b) that can communicate with a NB-IoT device, such as a UE (104). As an example, the UE (102) may communicate with Network Node 1 (102a) using one or more LTE frequencies, and the UE (102) may communicate with Network Node 2 (102b) using one or more GSM Enhanced Data Rates for GSM Evolution (EDGE) Radio Access Network (GERAN) frequencies.

As shown below, Table 1 provides some example use cases for using dual-mode or multi-mode chipsets. The example use cases column provides some examples of devices that may use a single, dual, or multi-mode chipset. The mobility describes whether an IoT devices is moved frequently or not much at all. The power sensitivity describes an IoT device's sensitivity to power consumption. Finally, the coverage column describes a location where the IoT devices may be used.

TABLE 1

| Example Use Cases for Using Dual-Mode or Multi-Mode Chipsets | | | | |
|---|---|---|---|---|
| Mode of Chipset | Example Use Cases | Mobility | Power Sensitivity | Coverage |
| NB-IoT only | Meters for water, gas, or electricity, etc. | Low | High (e.g., user equipment's (UE's) battery may not be rechargeable or replaceable) | Indoor deep coverage |
| NB-IoT + GSM (without voice) | Wearables devices, e.g., smart trackers; IoT security and industrial applications | High | High (e.g., UE's battery may not be easily recharged or replaced) | Outdoor or indoor deep coverage |
| NB-IoT + GSM (with voice) | Wearables devices, e.g., smart watch | High | Middle (UE's battery may be replaceable) | Outdoor |
| NB-IoT + eMTC or LTE | Wearables devices, e.g., medical equipment (middle or large volume data) | High | Middle or Low (e.g., UE's battery may be rechargeable or replaceable) | Outdoor |
| NB-IoT + GSM + eMTC or LTE | NB-IoT embedded in smart phone | High | Low (e.g., UE's battery may be easily rechargeable) | Outdoor |

Based on the analysis provided in Table 1 about the combination of modes, it is possible that the devices with dual-mode or multi-mode chipset may have middle or high mobility. Further, the current network deployments may bring overlapped coverage from different RAT cells, e.g., GSM cell, LTE cell, eMTC cell, or New Radio (NR) cell, that can be significant for outdoor UEs. However, one problem with current technology is that the current NB-IoT only supports ranking based intra-frequency and inter-frequency measurement and cell reselection and has no support for inter-RAT mobility. Thus, in some scenarios, a multi-RAT UE may be stuck in bad radio condition even though there may be a better alternative that may allow the multi-RAT UE to have, for example, better power consumption or better efficiency. As a result, the inter-RAT cell selection or reselection or even handover should be studied and specified to allow a UE to find good coverage and/or save power.

Furthermore, the inter-RAT cell selection or reselection or handover should be specified to allow a UE to communicate with a base station at a high data rate. The dual-mode or multi-mode UE can usually communicate with the NB-IoT network for power saving, but when the UE has access to a high data rate wireless service, it may be better for the UE to search and reselect the RAT providing the high data rate wireless service, e.g., 4G eMTC or LTE network.

For the IoT device supporting voice capabilities, the service requirement can be met in some scenario. For instance, if a user wants to trigger voice service, the UE should search and reselect a 2G or 4G network cell. If the performance needs to be guaranteed, a circuit-switched (CS) fallback can also be considered when the UE uses 2G network for voice.

Currently, inter-RAT measurements are a pre-condition step for inter-RAT cell selection or reselection. However, the inter-RAT measurements process may have a high-power consumption. Further, the configuration for inter-RAT measurements may also cause signaling overhead. In this patent document, techniques are described to overcome at least some of these drawback in current technology.

II. An Introduction to RAT Cell Selection or Reselection

Priorities based cell measurement and cell reselection is supported by legacy LTE system but not supported by NB-IoT. Absolute priorities of different Evolved Universal Terrestrial Radio Access Network (E-UTRAN) frequencies or inter-RAT frequencies may be provided to the UE in the system information, in the RRCConnectionRelease message, or by inheriting from another RAT at inter-RAT cell selection or reselection. In the case of system information, an E-UTRAN frequency or inter-RAT frequency may be listed without providing a priority (e.g., the field cellReselectionPriority may be absent for that frequency). If priorities are provided in dedicated signaling, the UE can ignore all the priorities provided in system information. If UE is in camped on any cell state, UE can only apply the priorities provided by system information from current cell, and the UE preserves priorities provided by dedicated signaling and deprioritisationReq received in RRCConnectionReject unless specified otherwise.

In current LTE specification, inter-frequency and inter-RAT measurement is performed according to the priorities and some thresholds configured by network. For example, (1) the rule for the frequencies with higher priority includes the UE always measuring and trying to move to the higher priority neighbor cell, and (2) the rule for the frequencies with same or lower priority includes the UE measuring and trying to move to the same or lower priority neighbor cell when the Srxlev and Squal are lower than the SnonIntraSearchP and Squal>SnonIntraSearchQ, where Srxlev is the cell selection RX level value, Squal is the cell selection quality value, SnonIntraSearchP is a RSRP threshold for a RAT frequency, and SnonIntraSearchQ is a RSRQ threshold for a RAT frequency.

In current LTE specification, inter-frequency and inter-RAT cell reselection is also evaluated according to the priorities and some thresholds configured by network. For example, (1) $Thresh_{X, HighQ}$, $Thresh_{X, HighP}$, for cell reselection to a cell on a higher priority frequency than the serving frequency (Table 2 shown below provides an explanation for these and other parameters); and (2) $Thresh_{Serving, LowQ}$, $Thresh_{Serving, LowP}$, $Thresh_{X, LowQ}$, $Thresh_{X, LowP}$, for cell reselection to a cell on a lower priority frequency than the serving frequency. The device may go for the first cell which can fulfil any one of the two conditions listed above.

TABLE 2

| RAT Reselection Parameters | |
|---|---|
| $Thresh_{X, HighQ}$ | For reselection to neighboring LTE frequencies with higher priority, Reference Signal Received Quality (RSRQ) threshold for each neighboring LTE frequencies in System Information Block Type 5 (SIB5) |
| $Thresh_{X, HighP}$ | For reselection to neighboring LTE frequencies with higher priority, Reference Signal Received Power (RSRP) threshold for each neighboring LTE frequencies in SIB5 For reselection to neighboring GERAN frequencies with higher priority, RSRP threshold for each neighboring GERAN frequencies in SIB7 |
| $Treselection_{RAT}$ | Timer for evaluating neighboring GERAN frequencies in SIB7 |

TABLE 2-continued

| RAT Reselection Parameters | |
|---|---|
| | Timer for evaluating neighboring LTE frequencies in SIB3 Timer for evaluating neighboring LTE frequencies in SIB5 |
| $Thresh_{Serving, LowP}$ | For triggering reselection to neighboring RATs with lower priority, the RSRP threshold for serving cell in SIB3 |
| $Thresh_{Serving, LowQ}$ | For triggering reselection to neighboring RATs with lower priority, the RSRQ threshold for serving cell in SIB3 |
| $Thresh_{X, LowQ}$ | For reselection to neighboring RATs with lower priority, RSRQ threshold for each neighboring LTE in SIB5 |
| $Thresh_{X, LowP}$ | For reselection to neighboring RATs with lower priority, RSRP threshold for each neighboring LTE frequencies in SIB5 For reselection to neighboring RATs with lower priority, RSRP threshold for each neighboring GERAN frequencies in SIB7 |

III. System Information Block (SIB) to Include Inter-RAT Information

In some embodiments, to enable a dual-mode or multi-mode device to be aware of the existence of one or more RATs in addition to the RAT currently service the device, a first step may be to broadcast the inter-RAT information in a NB-IoT network. One way to broadcast the inter-RAT information is to enable the existing SystemInformationBlockType7 (SIB7) to provide information relevant only for inter-RAT cell re-selection. For example, a network node, such as a base station, may broadcast a SIB7 to one or more UE in a NB-IoT network where the SIB7 may include information about GERAN frequencies relevant for cell re-selection. The network node may also broadest one or more other SIB(s) that may include eMTC or LTE frequency information. For example, SIB1-BR may include the frequency information for eMTC.

In some other exemplary embodiments, an integrated NB-IoT SIB is introduced for including inter-RAT information associated with one or more RATs. For example, an NB-IoT network may broadcast the integrated SIB, which can include some or all of the information included in SIB7. In the integrated NB-IoT SIB, any one or more of the following information may be included:

(i) The carrier priority and threshold of a serving frequency and/or of a serving cell, where the serving frequency and serving cell are associated with a RAT, e.g., NB-IoT, GERAN, eMTC, LTE, or 5G NR.

(ii) An indicator to indicate existence of one or more additional RATs.

The existence of one or more additional RATs can be indicated using, for example, a simple indication for indicating the existence of other RAT(s), a bitmap-type indication for indicating the existence of each of one or more other RATs, or a list of one or more indicators for indicating the existence of each of one or more other RATs. The one or more additional RATs may include, for example, NB-IoT, GERAN, eMTC, LTE, or 5G NR.

(iii) Carrier Information for One or More Additional RATs.

In some embodiments, the carrier information may be included in a carrier list that includes a carrier frequency (for eMTC, LTE, or NR) or set of one or more carrier frequencies (for GERAN). Each item in the carrier list is related to a carrier frequency or a set of one or more carrier frequencies, where the carrier list includes the one or more carrier frequencies, one or more priorities, one or more carrier frequency or cell radio quality thresholds, or one or more timers for evaluating the carrier frequency or cell radio quality, etc., The one or more priorities are associated with one or more frequencies or the one or more priorities are associated with one or more additional RATs, where the one or more frequencies for each additional RAT may have a same priority. In some embodiments, the threshold for cell radio quality may be configured for a carrier frequency so that the one or more cells operating on the carrier frequency may use the same threshold. In some embodiments, a same timer can be used by an NB-IoT device for evaluating the one or more carrier frequencies as part of the inter-RAT cell selection or re-selection measurement process.

In some embodiments, the carrier information may be included in a container list. Each item in the container list is related to a container for a certain RAT, where the container includes a carrier list. Each item of the carrier list may be related to a carrier frequency or a set of one or more carrier frequencies.

(iv) Access Information for the One or More Additional RATs.

The access information for the other RAT(s) can be used to assist the UE to more efficiently access the one or more additional RATs. The access information may include system information messages for at least one RAT. Access information can be included in each container of the container list mentioned in (iii) above.

Figure 2:
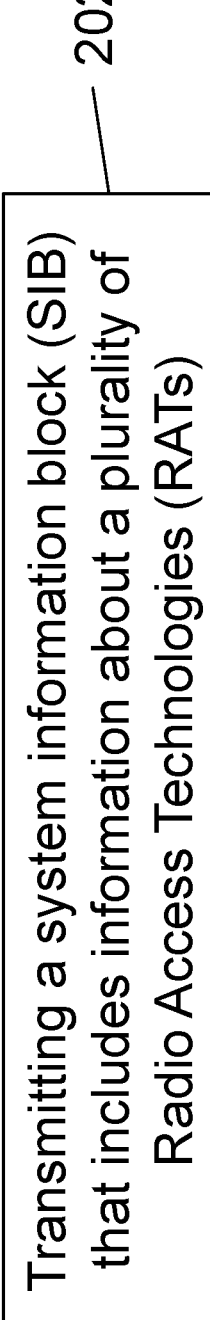
FIG. 2 describes an exemplary flowchart for a network node to broadcast an integrated system information block (SIB) for including information about multiple Radio Access Technologies (RAT).

FIG. 2 describes an exemplary flowchart for a network node to broadcast a SIB for including information about multiple RATs. At the transmitting operation 202, the network node transmits a system information block (SIB) that includes information about a plurality of Radio Access Technologies (RATs). The information includes any one or more of: (1) a first carrier priority value and a first threshold value of a serving frequency associated with a RAT, (2) a second carrier priority value and a second threshold value of a serving cell associated with the RAT, (3) an indicator to indicate existence of one or more additional RATs, (4) carrier information for the one or more additional RATs, and (5) access information to access the one or more additional RATs.

Figure 3:
FIG. 3 describes an exemplary flowchart for a communication node to receive a SIB.

FIG. 3 describes an exemplary flowchart for a communication node to receive a SIB. At the receiving operation 302, a communication node receives a system information block (SIB) that includes information about a plurality of Radio Access Technologies (RATs), where the information includes any one or more of: (1) a first carrier priority value and a first threshold value of a serving frequency associated with a RAT, (2) a second carrier priority value and a second threshold value of a serving cell associated with the RAT, (3) an indicator to indicate existence of one or more additional RATs, (4) carrier information for the one or more additional RATs, and (5) access information to access the one or more additional RATs.

The operations and features of FIGS. 2 and 3 may include additional features as described below.

In some embodiments, the indicator includes a simple indicator, a bitmap-type indicator, or a list of one or more indicators. In some embodiments, the carrier information is included in a carrier list that includes one or more frequencies, one or more priority values associated with the one or more frequencies or the one or more additional RATs, one or more carrier frequency or cell radio quality thresholds, or one or more timers.

In some embodiments, the carrier list is included in a container list, where each item in the container list relates to one RAT. In some embodiments, the access information includes a system information message for at least one RAT. In some embodiments, the RAT and the one or more additional RATs includes Narrowband Internet-of-Things (NB-IoT) technology, Global System for Mobile communications (GSM) Enhanced data rates for GSM evolution Radio Access Network (GERAN) technology, enhanced Machine-Type Communication (eMTC) technology, Long Term Evolution (LTE) technology, or Fifth Generation New Radio (5G NR) technology.

IV. Inter-RAT Cell Selection or Re-Selection without RAT Measurement

As mentioned in Table 1, dual-mode or multi-mode NB-IoT devices can have middle or high mobility. However, NB-IoT devices may have some differences, such as sensitivity to power consumption. Some NB-IoT devices may have high requirement on the power saving or have a high sensitivity to power consumption, e.g., smart tracker in some industrial scenarios. For these devices, if they have a regular route or a predictable path, or have a small range of mobility, the device may have historical information about the number and identities of one or more RAT frequencies or cells to which the device may connect at least because such historical information may be stable or may not change much with time. In such embodiments, an NB-IoT device may use historical information rather than perform an inter-RAT measurement to perform cell selection or re-selection as further explained below. Some other NB-IoT devices that are less sensitive to power consumption can apply inter-RAT measurement to beneficially obtain an accurate inter-RAT cell selection or re-selection process.

In some embodiments, historical information can be used by a UE that is located within and can communicate with another RAT cell but wants to communicate with a NB-IoT cell. If the RAT network does not provide or may not able to provide cell information about the NB-IoT cell, the UE can rely on the historical information about NB-IoT cell. Thus, there is a need supporting inter-rat cell selection or re-selection without performing certain RAT measurements for dual-mode or multi-mode devices that have regular route or predictable path, or that have a small range of mobility, or that are located in one RAT cell and prefer to communicate using another cell, such as an NB-IoT cell.

The techniques described in Section IV describe a device that performs an inter-RAT cell selection or re-selection process without performing RAT measurements on the cell to which the device wants to connect. In an exemplary embodiment, the device may store several frequencies and cells or RATs which have been accessed by the device during a period of time in the past. For instance, the device may store one or more carrier frequencies or one or more cells or one or more RATs based on a radio quality associated with each frequency or RAT. The one or more frequencies or one or more RATs may be associated with one or more priority values determined by the UE based on an evaluation of service of one or more cells using one or more factors. Some examples of the factors include radio quality (e.g., RSRP or RSRQ), access success rage, paging success rate, or service performance associated with one or more cells. The device may store additional information such as radio quality, access success rate, paging success rate, or service performance to a cell in a certain frequency or RAT.

A UE can determine that a serving cell quality (e.g., radio quality of Cell A) is lower than certain threshold, which may be hard-coded in the device or configured by the network, the UE may try to access another frequency or another RAT (e.g., a frequency of Cell B) with a highest priority (e.g., with the best radio quality) in the stored information without performing measurements on one or more other RATs that includes Cell B. In some embodiments, after the UE determines that a serving cell quality is lower than a threshold, the UE may first select a RAT based on a highest priority for the RAT, and the UE may select a frequency for that RAT based on a highest priority associated with the frequency for a list of one or more frequencies associated with that RAT.

If a device enters the process in which the inter-RAT cell selection or re-selection without performing RAT measurements on another cell, a timer may be used to stop the device from continuously performing inter-RAT cell selection or re-selection based on the historical information. For instance, if a UE determines that a serving cell quality is lower than a certain threshold, then the UE may start the timer and try to access other RATs without performing measurements on the other RATs. If the UE cannot access a suitable inter-RAT cell when the timer expires, the UE may stop the inter-RAT cell selection or re-selection process.

In some embodiments, a device may perform inter-RAT cell selection or re-selection without performing measurements on another RAT when the device receives a trigger based on an event. For instance, a device performs an inter-RAT cell selection or re-selection without performing measurements on one or more other RATs if the device receives an event trigger, such as, receiving any one or more of an indication that a voice service is required, or an indication that the device is out of service (e.g., without a signal) in the serving cell, or an indication that a radio quality of a cell in communication with the device is lower than a threshold, or an indication that a service with a high data rate is required.

Figure 4A:
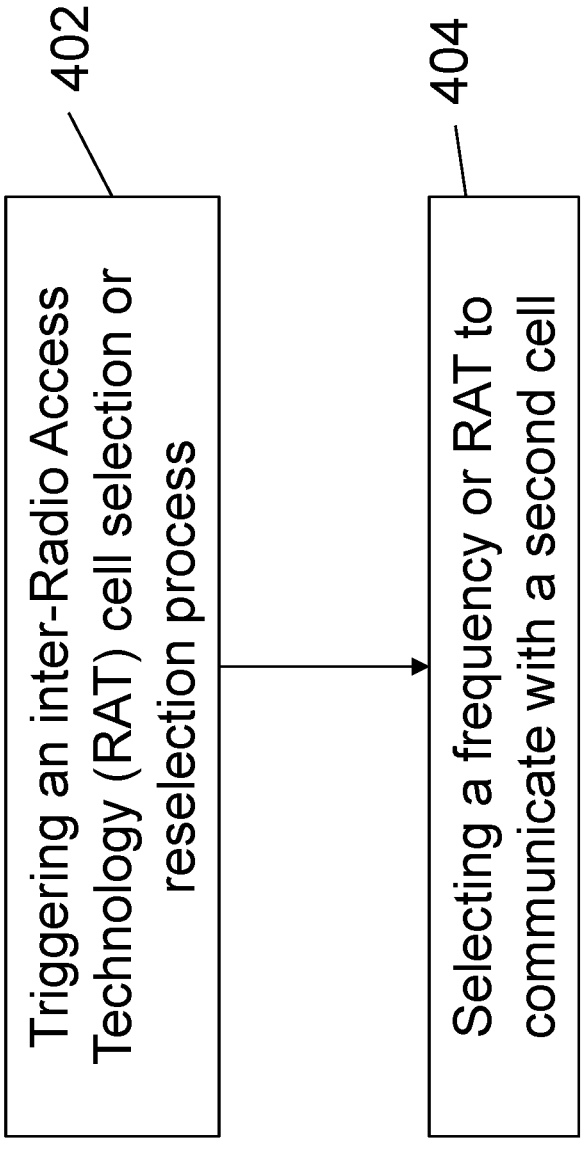
FIG. 4A describes an exemplary flowchart for a communication node to trigger an inter-RAT cell selection or re-selection.

FIG. 4A describes an exemplary flowchart for a communication node to trigger an inter-RAT cell selection or re-selection. At the triggering operation 402, the communication node triggers an inter-Radio Access Technology (RAT) cell selection or reselection process. The triggering of inter-RAT cell selection or reselection process may be based on an event as further described in FIG. 4B.

In response to the triggering operation 402, at the selecting operation 404, the communication node, selects a frequency or a RAT to communicate with a second cell. The communication node selects the frequency from one or more frequencies or selects the RAT from one or more RATs, where the one or more frequencies or one or more RATs have been previously accessed by the communication node. The one or more frequencies or one or more RATs may have been previously accessed during a time period. In some embodiments, the one or more frequencies are associated with one or more priority values determined by the communication node based on an evaluation of service of one or more cells. In some embodiments, the selected frequency has a highest priority among the one or more priority values associated with the one or more frequencies. In some embodiments, the communication node performs the selecting operation 404 without performing any measurements on one or more additional cells, including the second cell.

In some embodiments, the service of the one or more cells is evaluated based on any one of: radio quality, access success rate, paging success rate, and service performance. In some embodiments, the triggering and/or the selecting operations described in FIGS. 4A and 4B are performed while a timer is running.

Figures 4B, 5:
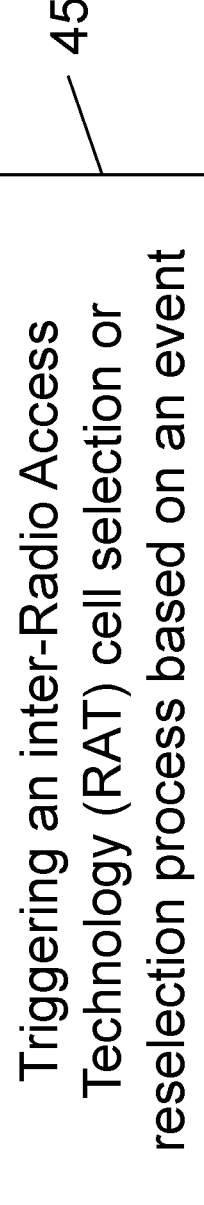
FIG. 4B describes an exemplary flowchart for a communication node to trigger an inter-RAT cell selection or re-selection based on an event.
FIG. 5 describes an exemplary flowchart for a network node to broadcast a first or a second set of parameters to a first type of communication nodes or a second type of communication nodes.

FIG. 4B describes an exemplary flowchart for a communication node to trigger an inter-RAT cell selection or re-selection based on an event. At the triggering operation 452, the communication node triggers an inter-Radio Access Technology (RAT) cell selection or reselection process based on an event. The event may include: the communication node determining that a quality of a first cell in communication with the communication node is lower than a threshold, or the communication node receiving a first indication that a voice service is required, or the communication node receiving a second indication that a service with high data rate is required, or the communication node receiving a third indication that the communication node is out of service in the first cell.

V. Measurement Configuration for Inter-RAT Cell Selection or Re-Selection

Section IV presents techniques to configure inter-RAT measurement, and Section V presents techniques to differentiate the Inter-RAT cell selection or re-selection based on a device's power sensitivity. As explained below, the techniques in Section V can be used to configure the measurement parameters according to a UE's power sensitivity.

For supporting the device with dual modes of, e.g., NB-IoT+GERAN, a network or a cell may set the inter-RAT measurement parameters based on device's power sensitivity as shown in Table 3. A value associated with each parameter in Table 3 is provided as an example. A network node or a base station associated with a cell may broadcast the two sets of parameters within the wireless range of the cell. A first set of parameters is for devices that have a low sensitivity to power consumption and a second set of parameters is for devices that have a high sensitivity to power consumption. The serving cell radio quality threshold indicates to the UE a threshold value used by the UE to trigger measurements.

TABLE 3

| Parameters Based on Device's Power Sensitivity | | |
|---|---|---|
| | Parameter set for low sensitivity to power consumption | Parameter set for high sensitivity to power consumption |
| Priority | Priority of the GERAN frequencies are higher than the priority of the current E-UTRAN frequency | Priority of the GERAN frequencies are same or lower than the priority of the current E-UTRAN frequency |
| Serving cell radio quality threshold for triggering measurement | Not Applicable (N/A), or s-NonIntraSearchP or s-NonIntraSearchQ is relatively big | s-NonIntraSearchP or s-NonIntraSearchQ is relatively small |
| The size of neighbor RAT or cells for measurement | The whole the frequencies or cell list are used | A factor indicating only first part of the frequencies or cell list are used |

FIG. 5 describes an exemplary flowchart for a network node to broadcast a first or a second set of parameters to a first type of communication nodes or a second type of communication nodes. At the transmitting operation 502, the network node transmits or broadcasts a first set of parameters for a first type of communication nodes or a second set of parameters for a second type of communication nodes. A first sensitivity to power consumption of the first type of communication nodes is lower than a second sensitivity to power consumption of the second type of communication nodes. The first set of parameters or the second set of parameters include any one or more of: a list of frequencies, priority values associated with the frequencies, and a threshold value indicative of a quality of transmission that triggers a measurement.

FIG. 6 describes an exemplary flowchart for a communication node to receive a first or a second set of parameters to a first type of communication nodes or a second type of communication nodes. At the receiving operation 602, a communication node receives a first set of parameters for a first type of communication nodes or a second set of parameters for a second type of communication nodes. A first sensitivity to power consumption of the first type of communication nodes is lower than a second sensitivity to power consumption of the second type of communication nodes. The first set of parameters or the second set of parameters include any one or more of: a list of frequencies, priority values associated with the frequencies, and a threshold value indicative of a quality of transmission that triggers a measurement.

VI. Inter-RAT Cell Selection or Re-Selection Configuration Based on Coverage Condition The inter-RAT cell selection or reselection process may be triggered by a change in the radio condition of a serving cell, or by inter-RAT neighboring cell measurements and/or by some events. In some embodiments for Section VI, the inter-RAT cell re-selection priority or threshold parameters, e.g., the priority, trigger timing, a size of neighbor RAT or cells, or the time interval for evaluation, etc., can be differentiated according to UE's coverage conditions. As an example, if the UE determines that it has good coverage in NB-IoT network, it may not be necessary for the UE to reselect to another RAT. In this example, the UE may select a set of inter-RAT parameters, shown in Table 4, so that it would be difficult for the UE to trigger inter-RAT cell re-selection. As another example, if the UE determines that it has a poor coverage in an NB-IoT network, the UE may select another set of inter-RAT parameters so that the UE can trigger cell re-selection process to connect to another RAT, e.g., GERAN.

For supporting the device with dual or multiple modes, such as NB-IoT+GERAN, multiple sets of inter-RAT cell reselection parameters can be configured according to UE's coverage conditions is shown in Table 4 below. In an exemplary embodiment, as shown in Table 4, three sets of parameters may be configured according to a coverage condition of a UE. A value associated with each parameter in Table 4 (e.g., $Treselection_{RAT}$ is "relatively long" for CEL 0) is provided as an example. The parameter set for CEL 0 may be for devices having a good wireless coverage, the parameter set for CEL 1 may be configured for devices having an intermediate wireless coverage, and the parameter set for CEL 2 may be configured for devices having poor wireless coverage. A network node may transmit the sets of parameters shown in Table 4 to one or more UEs. A network may configure two thresholds, e.g., −144 dB or −155 dB, for determining coverage enhancement level (CEL). If the UE measured radio quality (e.g., RSRP or RSRQ) of a serving cell is −140 dB, which is higher than −144 dB, then the UE may determine that the UE has normal or enhanced coverage (e.g., CEL 0) of this cell. If the RSRP is −150 dB, lower than −144 and larger than −155 dB, the UE may determine that the UE has intermediate coverage (e.g., in CEL 1), and if the RSRP is −158 dB, lower than −155 dB, then the UE may determine that the UE has poor coverage (e.g., CEL 2), the worst CEL level.

TABLE 4

| Parameters Based on Device's Coverage Condition | | | |
|---|---|---|---|
| | Parameter set for CEL 0 | Parameter set for CEL 1 | Parameter set for CEL2 |
| Priority | Priority of the GERAN frequencies are lower than the priority of the current E-UTRAN frequency | Priority of the GERAN frequencies are same as the priority of the current E-UTRAN frequency | Priority of the GERAN frequencies are higher than the priority of the current E-UTRAN frequency |
| $Thresh_{X,\ HighP}$ | N/A | N/A | $Thresh_{X,\ HighP}$ would be relatively low so that a UE can easily re-select a neighbor cell having radio quality (e.g., RSRP) higher than the threshold, $Thresh_{X,\ HighP}$ |
| $Treselection_{RAT}$ | Relatively long | Relatively long or middle | Relatively short |
| $Thresh_{serving,\ LowP}$ | $Thresh_{Serving,\ LowP}$ would be relative low so that a UE may not easyily select a serving cell having a radio quality lower than the threshold, $Thresh_{Serving,\ LowP}$ | $Thresh_{Serving,\ LowP}$ would be relatively middle or high | N/A |
| $Thresh_{X,\ LowP}$ | $Thresh_{X,\ LowP}$ is relatively high so that a UE may not easily re-select a neighbor cell having a radio quality higher than the threshold, $Thresh_{X,\ LowP}$ | N/A or $Thresh_{X,\ LowP}$ would be relative middle or low | N/A |

For multi-mode inter-RAT cell selection or re-selection, a UE may evaluate the selectivity of several RATs (NB network or GSM or eMTC or LTE or NR) simultaneously. The principles for inter-RAT measurement and cell reselection parameter configuration for dual-mode devices can be leveraged for multi-modes devices.

VII. Inter-RAT Cell Selection or Re-Selection Configuration Based on Bandwidth or Coverage Condition In current eMTC specification, the priority-based inter-RAT cell reselection is applied and same inter-RAT cell reselection parameters would be used by bandwidth reduced low complexity (BL) UE and non-BL UE in EC. This is not suitable as the difference in capabilities between BL UE and non-BL UE is not considered here, e.g., the non-BL UE has stronger transmission and reception capability and non-BL should have higher priority to select or re-select legacy LTE system, or to select or re-select NR system.

The separate inter-RAT measurement or cell re-selection parameter sets, e.g., including the parameters mentioned in Tables 3 and 4, can be configured according to any one or more of the following conditions of the eMTC UE: the coverage condition (as described in Section VI), and bandwidth condition.

In some embodiments, a network node may send to a UE two sets of parameters, as shown in Table 5, one set of parameters for BL UE and another set of parameters for non-BL UE. The UE may select one of the two sets of parameters according to a coverage condition determined by the UE. A value associated with each parameter is provided as an example.

TABLE 5

Example eMTC and NR inter-RAT Parameters
Based on Device's Coverage Condition

| | Parameter Set for BL UE | Parameter Set for non-BL UE |
|---|---|---|
| Priority | NR system has lower priority than eMTC | NR system has higher priority than eMTC |
| Serving cell radio quality threshold for triggering measurement | Serving cell radio quality threshold may be relative low | Serving cell radio quality threshold may be relative high |
| The size of neighbor RAT or cells for measurement | relative small | relative big |
| $Thresh_{X, HighP}$ | N/A | relative low |
| $Treselection_{RAT}$ | relative long | relative short |
| $Thresh_{Serving, LowP}$ | relative low | N/A |
| $Thresh_{X, LowP}$ | relative high | N/A |

In some embodiments, a network node may send to a UE three sets of parameters, as shown in Table 6. In Table 6, a first set of parameters for BL UE in normal wireless coverage, a second set of parameters for BL UE in enhanced wireless coverage, and a third set of parameters for non-BL UE in enhanced wireless coverage.

The UE may select one of the three parameter sets according to the UE's coverage condition and bandwidth condition. A value associated with each parameter is provided as an example.

TABLE 6

Parameters Based on Device's Bandwidth and Coverage Condition

| | Parameter set for BL UE in normal coverage | Parameter set for BL UE in enhanced coverage | Parameter set for non-BL UE in enhanced coverage |
|---|---|---|---|
| Priority | NR system has lower priority than eMTC | NR system has same priority as eMTC | NR system has higher priority than eMTC |
| Serving cell radio quality threshold for triggering measurement | Serving cell radio quality threshold may be relative low | Serving cell radio quality threshold may be middle | Serving cell radio quality threshold may be relative high |
| The size of neighbor RAT or cells for measurement | relative small | middle | relative big |
| $Thresh_{X, HighP}$ | N/A | N/A | relative low |
| $Treselection_{RAT}$ | relative long | middle | relative short |

TABLE 6-continued

Parameters Based on Device's Bandwidth and Coverage Condition

| | Parameter set for BL UE in normal coverage | Parameter set for BL UE in enhanced coverage | Parameter set for non-BL UE in enhanced coverage |
|---|---|---|---|
| $Thresh_{Serving, LowP}$ | relative low | middle | N/A |
| $Thresh_{X, LowP}$ | relative high | middle | N/A |

Figure 7:
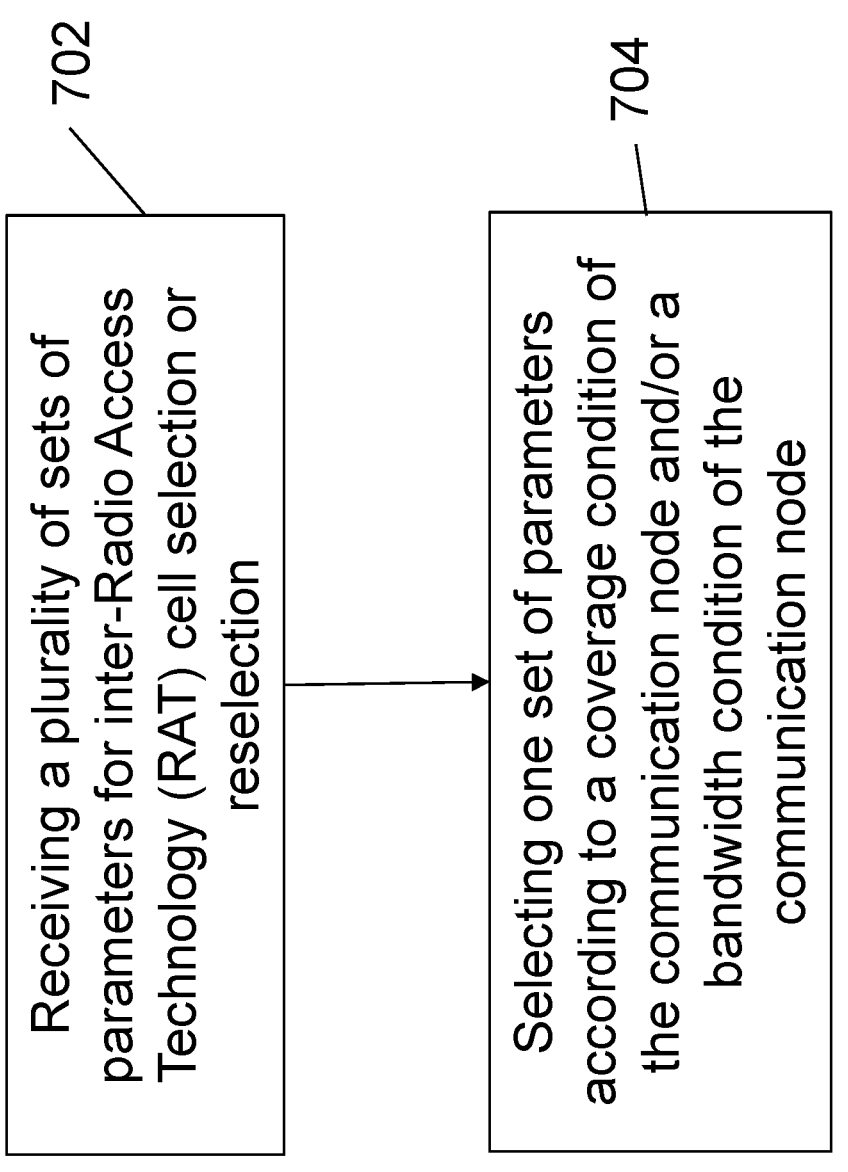
FIG. 7 describes an exemplary flowchart for a communication node to select a set of parameters based on a coverage condition or a bandwidth condition.

FIG. 7 describes an exemplary flowchart for a communication node to select a set of parameters based on a coverage condition or a bandwidth condition, as explained in Sections VI and VII. At the receiving operation 702, a communication node receives a plurality of sets of parameters for inter-Radio Access Technology (RAT) cell selection or reselection. Each set of parameters includes any one or more of: priority values associated with frequencies, a first threshold to select a first frequency having a higher priority than a priority of a serving frequency used by the communication, a second threshold to select a second frequency having a lower priority than the priority of the serving frequency used by the communication, a timer to evaluate one or more of the plurality of frequencies for a reselection process, and a third threshold to select a cell having a lower priority than a priority of a currently serving cell. In some embodiments, each set of parameters further includes any one or more of: a list of the frequencies, and a threshold value indicative of a quality of transmission that triggers a measurement.

At the selection operation 704, the communication node selects one set of parameters according to a coverage condition of the communication node and/or a bandwidth condition of the communication node. In some embodiments, the communication node selects one set of parameters according to the coverage condition determined based on radio quality of the currently serving cell. In some embodiments, the communication node selects one set of parameters according to the bandwidth condition by determining that the communication node is a Bandwidth reduced Low complexity (BL) communication node or a non-BL communication node.

FIG. 8 describes an exemplary flowchart for a network node to transmit sets of parameters to one or more communication nodes, as explained in Sections VI and VII. At the transmitting operation 802, the network node transmits a plurality of sets of parameters for inter-Radio Access Technology (RAT) cell selection or reselection. Each set of parameters includes any one or more of: priority values associated with frequencies, a first threshold to select a first frequency having a higher priority than a priority of a serving frequency used by the communication, a second threshold to select a second frequency having a lower priority than the priority of the serving frequency used by the communication, a timer to evaluate one or more of the plurality of frequencies for a reselection process, and a third threshold to select a cell having a lower priority than a priority of a currently serving cell. In some embodiments, each set of parameters further includes any one or more of: a list of the frequencies, and a threshold value indicative of a quality of transmission that triggers a measurement.

VIII. Inter-RAT Cell Selection or Re-Selection Offset

In current eMTC specification, a ranking mechanism is applied for intra-frequency and inter-frequency cell reselection irrespective of configured frequency priorities, if any while the UE is in enhanced coverage. The ranking mechanism includes the UE sorting the cells based on their radio quality and choosing the best one. But if the UE determines that it is in a normal wireless coverage, the priority-based inter-frequency cell reselection is still applied by the UE, resulting in a constant inter-frequency cell re-selection process. For example, when the eMTC UE is in a source cell (cell A) with normal coverage, there exists the possibility that the UE may re-select a cell (cell B) with bad radio quality in a frequency with higher priority. In this example, the UE may only be in enhanced coverage in cell B. Next, the UE will use ranking mechanism for another inter-frequency cell re-selection according to current eMTC specification because cell A may have good radio quality and may now be in the top of a list of sorted cells (e.g., cell A may have a higher priority than cell B).

In an exemplary embodiment, as further explained below, an offset can be introduced and applied to the measured radio quality of one or more cell or frequencies (e.g., a source cell or frequency) from which the UE selects or re-selects to other cells or frequencies (e.g., a target cell or frequency) in order to reduce the possibility that the source cell or frequencies are selected again during the inter-frequency cell selection or re-selection.

In some embodiments, a UE in a normal coverage in Cell A may determine that a RSRP or RSRQ value for signals received from Cell A is lower than a threshold, and then the UE performs radio quality (e.g., RSRP or RSRQ) measurements for one or more cells on one or more frequencies which have higher priorities compared to the priority of the frequency associated with Cell A. Next, the UE re-select to Cell B which has higher priority and the UE may have enhanced coverage (e.g., CEL 2) in Cell B. Next, the UE can further perform inter-frequency measurement and re-selection. Because the UE has enhanced coverage, UE may simply rank all the measured neighboring cell in a list based on their radio quality regardless of priority. Cell A may be included in the ranked cell list based on the radio quality of Cell A. The order of the cells in the list is indicative of Next, the UE may add an offset value to the measured radio quality of Cell A in order to descend its order in the list. After the offset value is added to the measured radio quality of Cell A, the list may re re-sorted in an order according to radio quality (e.g., highest radio quality to lowest radio quality) of the cells. Next, UE may re-select to a cell other than Cell A, e.g., Cell C.

FIG. 9 describes an exemplary flowchart for a communication node performing an cell selection or re-selection offset process. At the determining operation 902, a communication node determines that a radio quality of a first cell serving the communication node is lower than a threshold. In response to the determining operation 902, at the measuring operation 904, the communication node measures one or more radio qualities corresponding to one or more additional cells.

At the selecting operation 906, the communication node selects a second cell from the one or more additional cells. At the demoting operation 908, the communication node demotes a position of the first cell on a list arranged according to the radio quality and the one or more radio qualities of the first cell and the one or more additional cells, respectively. In some embodiments, the position of the first cell is demoted by: sorting in the list the first cell and the one or more additional cells based on the radio quality and the one or more radio qualities, and moving the first cell from a first location on the list to a second location on the list, where the second location indicates that the first cell has a lower radio quality than the first location. In some embodiments, the first cell is moved from the first location to the second location by applying an offset value to the radio quality of the first cell.

Figure 10:
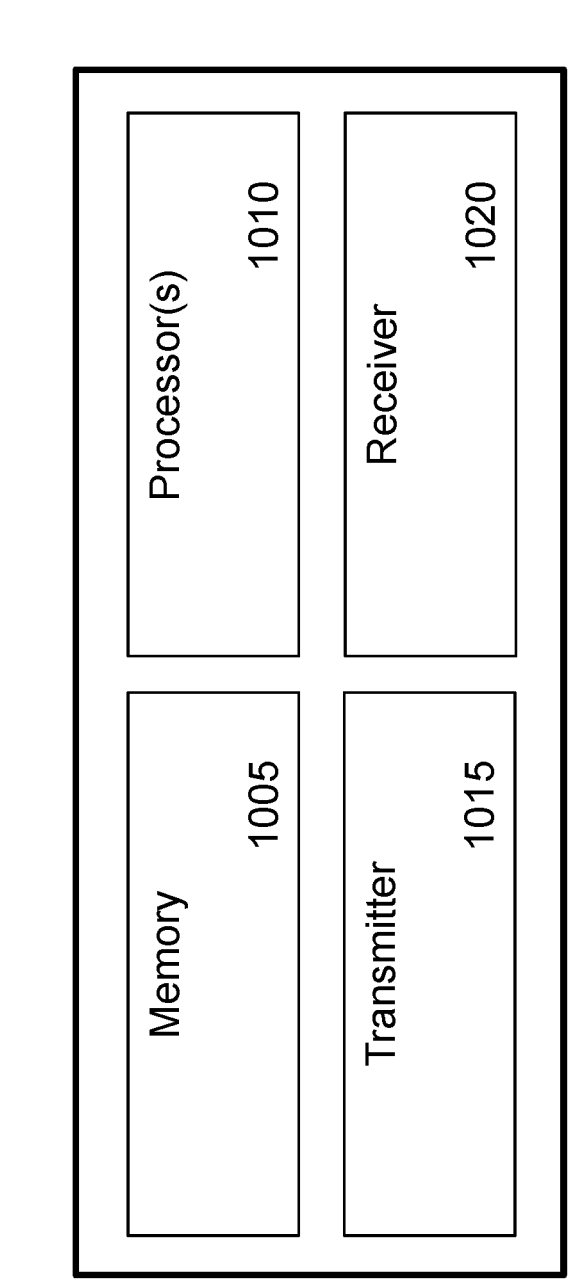
FIG. 10 shows a block diagram for an exemplary hardware platform.

FIG. 10 shows an exemplary block diagram of a hardware platform 1000 that may be a part of a network node, such as a base station, or that may be a part of a communication node, such as an NB-IoT device. The hardware platform 1000 includes at least one processor 1010 and a memory 1005 having instructions stored thereupon. The instructions upon execution by the processor 1010 configure the hardware platform 1000 to perform the operations described for FIGS. 2 to 9 and in the various embodiments described in this patent document. The transmitter 1015 transmits or sends information or data to another node. For example, a network node transmitter can send one or more sets of parameters to one or more communication nodes. The receiver 1020 receives information or data transmitted or sent by another node. For example, a communication node can receive a set of parameters from a network node.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

transmitting, by a network node, a system information block (SIB) that includes information about a plurality of Radio Access Technologies (RATs), wherein the information includes an indicator to indicate existence of one or more additional RATs, and carrier information for the one or more additional RATs, wherein the carrier information is included in a carrier list that includes a plurality of frequencies, wherein the carrier list further includes one timer to evaluate the plurality of frequencies for both an inter-RAT cell selection process and re-selection measurement process in response to a quality of a serving cell associated with a RAT being lower than a threshold value, wherein the carrier list is included in a container list, wherein each item in the container list relates to one RAT, and wherein the information further includes access information to access the one or more additional RATs.

2. The method of claim 1, wherein the RAT and the one or more additional RATs includes Narrowband Internet-of-Things (NB-IoT) technology, Global System for Mobile communications (GSM) Enhanced data rates for GSM evolution Radio Access Network (GERAN) technology, enhanced Machine-Type Communication (eMTC) technology, or Long Term Evolution (LTE) technology.

3. A wireless communication method, comprising:

receiving, by a communication node, a system information block (SIB) that includes information about a plurality of Radio Access Technologies (RATs), wherein the information includes an indicator to indicate existence of one or more additional RATs, and carrier information for the one or more additional RATs, wherein the carrier information is included in a carrier list that includes a plurality of frequencies, wherein the carrier list further includes one timer to evaluate the plurality of frequencies for both an inter-RAT cell selection process and re-selection measurement process in response to a quality of a serving cell associated with a RAT being lower than a threshold value, wherein the carrier list is included in a container list, wherein each item in the container list relates to one RAT, and wherein the information further includes access information to access the one or more additional RATs; and upon determining that a quality of the serving cell is lower than the threshold value:

starting the one timer, and evaluating, while the one timer is running, the plurality of frequencies as part of the inter-RAT cell selection process or the re-selection measurement process.

4. The method of claim 3, wherein the RAT and the one or more additional RATs includes Narrowband Internet-of-Things (NB-IoT) technology, Global System for Mobile communications (GSM) Enhanced data rates for GSM evolution Radio Access Network (GERAN) technology, enhanced Machine-Type Communication (eMTC) technology, or Long Term Evolution (LTE) technology.

5. A wireless communication apparatus, comprising at least one processor that is configured to perform a method that causes the wireless communication apparatus to:

transmit, by a network node, a system information block (SIB) that includes information about a plurality of Radio Access Technologies (RATs), wherein the information includes an indicator to indicate existence of one or more additional RATs, and carrier information for the one or more additional RATs, wherein the carrier information is included in a carrier list that includes a plurality of frequencies, wherein the carrier list further includes one timer to evaluate the plurality of frequencies for both an inter-RAT cell selection process and re-selection measurement process in response to a quality of a serving cell associated with a RAT being lower than a threshold value, wherein the carrier list is included in a container list, wherein each item in the container list relates to one RAT, and wherein the information further includes access information to access the one or more additional RATs.

6. The wireless communication apparatus of claim 5, wherein the RAT and the one or more additional RATs includes Narrowband Internet-of-Things (NB-IoT) technology, Global System for Mobile communications (GSM) Enhanced data rates for GSM evolution Radio Access Network (GERAN) technology, enhanced Machine-Type Communication (eMTC) technology, or Long Term Evolution (LTE) technology.

7. A wireless communication apparatus, comprising at least one processor that is configured to perform a method that causes the wireless communication apparatus to:

receive a system information block (SIB) that includes information about a plurality of Radio Access Technologies (RATs), wherein the information includes an indicator to indicate existence of one or more additional RATs, and carrier information for the one or more additional RATs, wherein the carrier information is included in a carrier list that includes a plurality of frequencies, wherein the carrier list further includes one timer to evaluate the plurality of frequencies for both an inter-RAT cell selection process and re-selection measurement process in response to a quality of a serving cell associated with a RAT being lower than a threshold value, wherein the carrier list is included in a container list, wherein each item in the container list relates to one RAT, and wherein the information further includes access information to access the one or more additional RATs; and upon determining that a quality of the serving cell is lower than the threshold value;

start the one timer, and evaluate, while the one timer is running, the plurality of frequencies as part of the inter-RAT cell selection process or the re-selection measurement process.

8. The wireless communication apparatus of claim 7, wherein the RAT and the one or more additional RATs includes Narrowband Internet-of-Things (NB-IoT) technology, Global System for Mobile communications (GSM) Enhanced data rates for GSM evolution Radio Access Network (GERAN) technology, enhanced Machine-Type Communication (eMTC) technology, or Long Term Evolution (LTE) technology.

\* \* \* \* \*